United States Patent
Tirimacco

(10) Patent No.: US 6,846,383 B2
(45) Date of Patent: Jan. 25, 2005

(54) WIPING PRODUCTS MADE ACCORDING TO A LOW TEMPERATURE DELAMINATION PROCESS

(75) Inventor: Maurizio Tirimacco, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 189 days.

(21) Appl. No.: 10/192,781

(22) Filed: Jul. 10, 2002

(65) Prior Publication Data

US 2004/0007339 A1 Jan. 15, 2004

(51) Int. Cl.[7] .......................... D21H 23/72; B31F 1/12
(52) U.S. Cl. ...................... 162/112; 162/111; 162/135; 162/164.1; 162/168.1; 162/150; 162/142; 156/183; 264/282; 428/195.1
(58) Field of Search .................. 162/109, 111–113, 162/117, 123, 125, 129, 157.6, 135–137, 164.1, 168, 142, 150, 169; 156/183, 220, 277–278, 291; 264/282–283, 128; 428/152–153, 156, 195.1

(56) References Cited

U.S. PATENT DOCUMENTS

| | | | | |
|---|---|---|---|---|
| 3,017,317 A | * | 1/1962 | Voigtman et al. | 162/111 |
| 3,821,068 A | * | 6/1974 | Shaw | 162/111 |
| 3,879,257 A | | 4/1975 | Gentile et al. | |
| 3,903,342 A | * | 9/1975 | Roberts, Jr. | 428/153 |
| 4,000,237 A | * | 12/1976 | Roberts, Jr. | 264/128 |
| 4,072,557 A | * | 2/1978 | Schiel | 162/111 |
| 4,125,659 A | * | 11/1978 | Klowak et al. | 428/153 |
| 4,158,594 A | * | 6/1979 | Becker et al. | 162/112 |
| 4,208,459 A | * | 6/1980 | Becker et al. | 428/154 |
| 4,326,000 A | * | 4/1982 | Roberts, Jr. | 428/153 |
| 4,507,173 A | * | 3/1985 | Klowak et al. | 162/112 |
| 4,610,743 A | * | 9/1986 | Salmeen et al. | 156/183 |
| 5,129,988 A | | 7/1992 | Farrington, Jr. | |
| 5,429,686 A | | 7/1995 | Chiu et al. | |
| 5,494,554 A | | 2/1996 | Edwards et al. | |
| 5,529,665 A | | 6/1996 | Kaun | |
| 5,656,132 A | | 8/1997 | Farrington, Jr. et al. | |
| 5,672,248 A | | 9/1997 | Wendt et al. | |
| 5,674,590 A | * | 10/1997 | Anderson et al. | 428/154 |

(List continued on next page.)

FOREIGN PATENT DOCUMENTS

| | | | | |
|---|---|---|---|---|
| WO | WO 9855695 A1 | 12/1998 | | |
| WO | WO 9934057 A1 | 7/1999 | | |
| WO | WO 9934060 A1 | * 7/1999 | | D21H/25/06 |
| WO | WO 0066835 A1 | 11/2000 | | |

*Primary Examiner*—José A. Fortuna
*Assistant Examiner*—Teyukara Laud
(74) *Attorney, Agent, or Firm*—Dority & Manning, P.A.

(57) ABSTRACT

The present invention is generally directed to paper products having great softness and strength. The paper products are formed from a paper web that can be made according to various methods. In one embodiment, the paper web is an uncreped through-air dried web. The web can contain softwood fibers in combination with high-yield fibers. For example, the high-yield fibers can be contained in the middle layer of a stratified fiber furnish. In accordance with the present invention, a first bonding material is applied to a first side of the web and a second bonding material is applied to a second side of the paper web. The bonding materials are applied according to preselected patterns. At least one side of the paper web is creped after one of the bonding materials is applied. The bonding material applied to the creped side of the web can be an adhesive selected that allows the web to be creped at relatively low temperatures.

36 Claims, 6 Drawing Sheets

U.S. PATENT DOCUMENTS

| | | | |
|---|---|---|---|
| 5,830,321 A * | 11/1998 | Lindsay et al. | 162/204 |
| 5,989,682 A * | 11/1999 | Anderson | 428/152 |
| 6,096,152 A * | 8/2000 | Anderson et al. | 156/183 |
| 6,096,169 A | 8/2000 | Hermans et al. | |
| 6,117,492 A | 9/2000 | Goldstein et al. | |
| 6,120,642 A | 9/2000 | Lindsay et al. | |
| 6,129,815 A * | 10/2000 | Larson et al. | 162/111 |
| 6,143,135 A | 11/2000 | Hada et al. | |
| 6,187,139 B1 * | 2/2001 | Edwards et al. | 162/112 |
| 6,187,140 B1 * | 2/2001 | Anderson et al. | 162/112 |
| 6,197,154 B1 | 3/2001 | Chen et al. | |
| 6,228,216 B1 * | 5/2001 | Lindsay et al. | 162/111 |
| 2004/0007339 A1 * | 1/2004 | Tirimacco | 162/111 |
| 2004/0031578 A1 * | 2/2004 | Tirimacco | 162/111 |

\* cited by examiner

WIPING PRODUCTS MADE ACCORDING TO A LOW TEMPERATURE DELAMINATION PROCESS

BACKGROUND OF THE INVENTION

Absorbent paper products such as paper towels, facial tissues and other similar products are designed to include several important properties. For example, the products should have good bulk, a soft feel and should be highly absorbent. The product should also have good strength even while wet and should resist tearing. Unfortunately, it is very difficult to produce a high strength paper product that is also soft and highly absorbent. Usually, when steps are taken to increase one property of the product, other characteristics of the product are adversely affected. For instance, softness is typically increased by decreasing or reducing fiber bonding within the paper product. Inhibiting or reducing fiber bonding, however, adversely affects the strength of the paper web.

One particular process that has proved to be very successful in producing paper towels and wipers is disclosed in U.S. Pat. No. 3,879,257 to Gentile, et al., which is incorporated herein by reference in its entirety. In Gentile, et al., a process is disclosed in which a bonding material is applied in a fine, spaced apart pattern to one side of a fibrous web. The web is then adhered to a heated creping surface and creped from the surface. A bonding material is applied to the opposite side of the web and the web is similarly creped. The process disclosed in Gentile, et al. produces wiper products having exceptional bulk, outstanding softness and good absorbency. The surface regions of the web also provide excellent strength, abrasion resistance, and wipe-dry properties.

Although the process and products disclosed in Gentile, et al. have provided many advances in the art of making paper wiping products, further improvements in various aspects of paper wiping products remain desired. For example, many commercially available adhesives that may be used in the process disclosed in Gentile, et al. require that the paper product be placed on a heated creping surface prior to being creped from the surface. Further, in order for the adhesives to be subjected to a sufficient amount of heat, the paper must remain on a heated creping surface for an extended period of time requiring the creping drum to have a relatively large diameter. Thus, many conventional print bonded creping processes have high energy requirements.

In view of the above, a need exists for a print creping process that requires less energy in producing a product. In particular, it is believed that the process can be made much more economical if an adhesive can be selected that has lower temperature requirements during creping. Further, a need also exists for a single creped product that has improved properties and characteristics.

SUMMARY OF THE INVENTION

In general, the present invention is directed to a method for producing paper products. The paper products can be, for instance, paper towels, industrial wipers, facial tissues, bath tissues, napkins, and the like. The process includes the steps of providing a paper web containing papermaking fibers. A first bonding material is applied to a first side of the web in a preselected pattern. A second bonding material is applied in a preselected pattern to the second side of the web. The second side of the web is then adhered to a creping surface at a temperature of greater than about 50° F. and less than about 200° F. More particularly, the temperature of the creping surface is less than about 150° F., and in one embodiment is at ambient temperatures. Once adhered to the creping surface, the second side of the web is creped from the creping surface using a creping blade.

Thus, in one embodiment, the present invention is generally directed to a print creping process that can occur at relatively lower temperatures. Further, since the creping adhesive used in the present invention does not require relatively large amounts of heat in order to bond to a creping surface, the paper product treated in accordance with the present invention can remain on a creping surface for a period of time much shorter in duration than many conventional processes. As such, the creping drum in the process of the present invention can have a smaller diameter than many drums used in the past in similar processes.

The papermaking fibers used to construct the paper web of the present invention can vary depending on the particular application. For instance, hardwood and softwood fibers can be used. In one embodiment, the paper web can also include high-yield fibers, such as thermomechanical pulp. The high-yield fibers can be present in the web in an amount from about 5% to about 40% by weight. In one embodiment, the paper web is a single ply web containing multiple layers. The web can include a middle layer containing the high-yield fibers either alone or in combination with other fibers such as softwood fibers and/or hardwood fibers. The outer layers can also contain softwood fibers.

The paper web that is treated in accordance with the present invention can be made according to different processes. For example, the web can be a wet-creped base sheet or an uncreped through-air dried base sheet. The paper web can have a basis weight of from about 15 gsm to about 110 gsm, and particularly from about 35 gsm to about 70 gsm. Besides different types of fibers, the web can also contain a debonding agent. For example, a debonding agent can be present in the web in an amount from about 1 kg per metric tonne to about 6 kg per metric tonne based upon the total weight of fibers contained in the web.

As described above, a first bonding material is applied to the first side of the web in a preselected pattern, while a second bonding material is applied to the second side of the web in a preselected pattern. The first and second bonding materials can be the same materials or can be different bonding materials. Further, the patterns that are used to apply the bonding materials can be the same or different. For example, the patterns can be reticulated patterns or can be patterns that comprise a succession of discrete shapes.

In one embodiment, when only creping one side of the web, the second bonding material is added in a manner that covers a greater amount of surface area than the first bonding material. In general, the first and second bonding materials can be applied to the first and second sides of the paper web in a combined amount of from about 2% to 25% by weight of the paper web, particularly about 4% to about 10% by weight, and more particularly from about 6% to about 8% by weight of the web.

In one embodiment, the bonding materials can be applied to each side of the paper web in patterns that comprise a succession of discrete shapes. For instance, the bonding material can be applied to the first side of the paper web (uncreped side) in a pattern that comprises a succession of discrete dots. The bonding material applied to the second side of the web (creped side), on the other hand, can comprise a succession of, for instance, hexagons. The patterns applied to the first and second sides of the web can cover approximately the same amount of surface area. For instance, each pattern can cover from about 25% to about 75% of the surface area on each side of the web, and particularly from about 40% to about 60% of the surface area of each side of the web.

As described above, however, in one embodiment, the bonding material applied to the second side or the creped side of the web can cover a greater amount of surface area than the bonding material applied to the first side of the web. In this embodiment, for instance, the bonding material applied to the second side of the web can cover greater than about 45% of the surface area of the second side of the web, and particularly can be applied in a pattern that covers greater than about 50% of the surface area of the second side of the web. The bonding material applied to the first side of the web, however, can be applied in a manner that covers less than the surface area covered by the bonding material applied to the second side of the web. For example, the bonding material applied to the first side of the web can be applied in a manner that covers less than 50% of the surface area of the web.

In accordance with the present invention, the second bonding material that is applied to the web is a bonding material that will adhere to a creping surface at relatively low temperatures, such as less than about 150° F. The bonding material can have a glass transition temperature of from about 10° C. to about −20° C.

The through-air dried web can also undergo rush transfer between two web conveying devices in the papermaking line, such as between a first fabric and a second moving fabric prior to applying the bonding materials. The second fabric can be downstream from the first fabric and can move at a speed that is about 5% to about 45% slower than the first fabric.

Through the process of the present invention, various paper products can be formed. The paper products can be single-ply products that can be used in various wiping applications.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
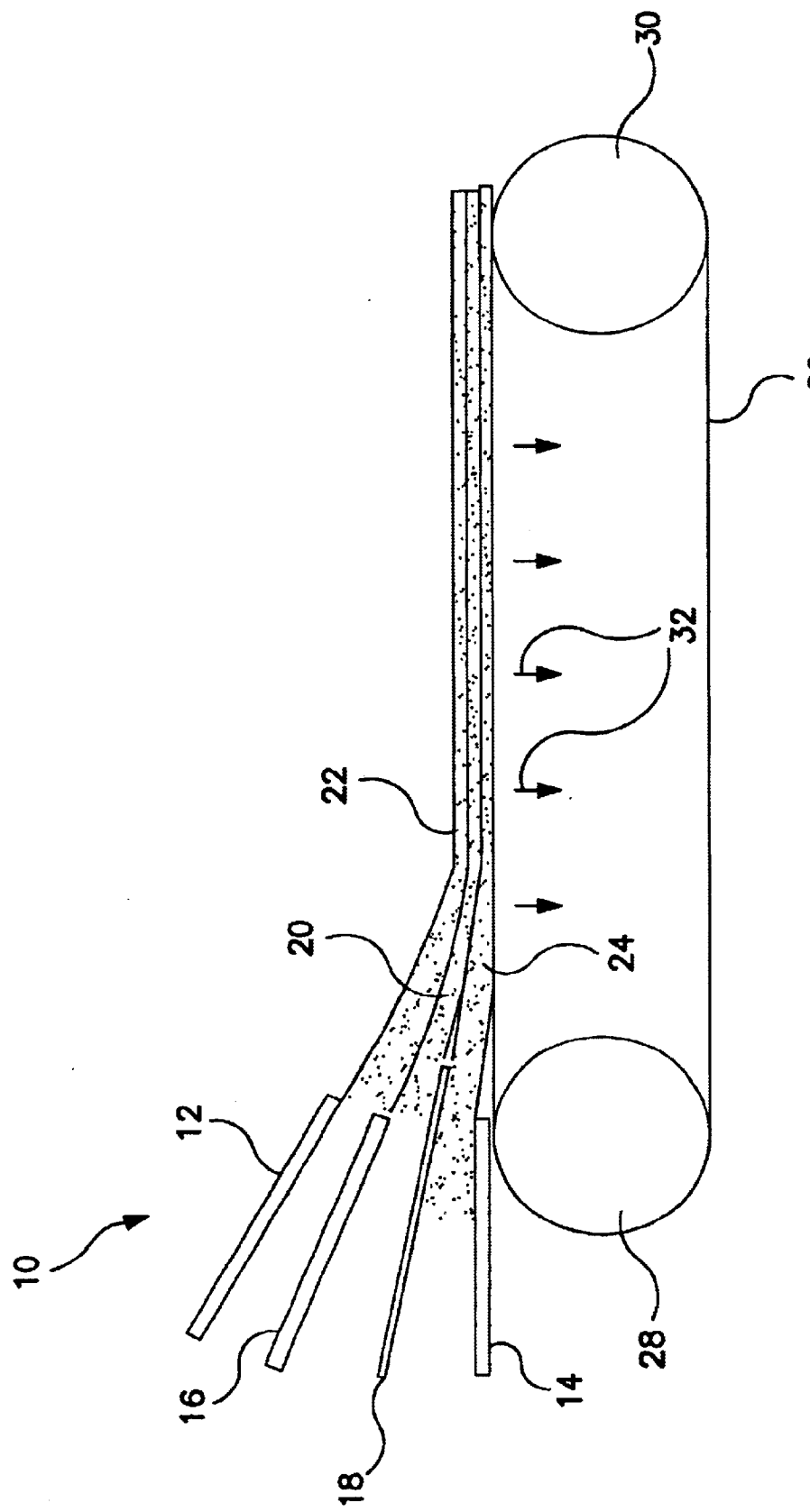
FIG. 1 is a schematic diagram of a paper web forming machine, illustrating the formation of a stratified paper web having multiple layers in accordance with the present invention.

Repeat use of reference characters in the present specification and drawings is intended to represent same or analogous features or elements of the present invention.

DETAILED DESCRIPTION

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a process for producing paper wiping products having great softness and strength characteristics. In particular, the wiping products have high strength values when either dry or wet. Further, the products have good stretch characteristics and are tear resistant. The products also have an increased sheet caliper, and increased bulk.

The process of the present invention generally involves applying a first bonding material to a first side of a base sheet or paper web. A second bonding material, which can be the same or different from the first bonding material, is applied according to a preselected pattern to the second side of the paper web. The second side of the paper web is then adhered to a creping surface and creped from the surface.

In accordance with the present invention, the second bonding material used in the present invention is a bonding material that will adhere to a creping surface at a relatively low temperature. For instance, during the creping process, the creping surface can be heated to a temperature of less than about 200° F., particularly at a temperature of less than about 150° F. and more particularly at a temperature of less than about 125° F. In one embodiment, for instance, the creping surface can be at ambient temperatures.

Many advantages and benefits can be realized when using a creping adhesive that has relatively low temperature requirements. For instance, the total energy requirements of the process are significantly reduced. Further, when using a low temperature creping adhesive, the web need not remain on the creping surface for any extended period of time. As such, the size of the creping drum can be reduced and/or the web can remain on the creping drum for a relatively short period of time. For example, the web can remain on the creping drum for a period of less than about 0.3 seconds, particularly for a period of less than about 0.25 seconds and more particularly for a period of less than about 0.22 seconds. By shortening the amount of time the paper is required to be on the creping drum, the process becomes faster and more efficient and capable of producing more product per unit time.

The second bonding material can have a glass transition temperature of less than about 10° C., particularly less than about −5° C., and more particularly can have a glass transition temperature of from about 10° C. to about −20° C.

In accordance with the present invention, the bonding materials are applied to the paper web in preselected patterns for providing strength and stretchability. Creping the web, on the other hand, causes delamination and increases the sheet caliper and cross-directional stretch of the web. By increasing caliper, creping also increases the bulk of the sheet making the paper web feel softer.

Paper webs processed according to the present invention can be made in different manners and can contain various different types of fibers. In general, however, the paper web contains papermaking fibers, such as softwood fibers. In addition to softwood fibers, the paper web can also contain hardwood fibers such as eucalyptus fibers and/or high-yield pulp fibers.

As used herein, "high-yield pulp fibers" are those papermaking fibers produced by pulping processes providing a yield of about 65 percent or greater, more specifically about 75 percent or greater, and still more specifically from about 75 to about 95 percent. Yield is the resulting amount of processed fiber expressed as a percentage of the initial wood mass. Such pulping processes include bleached chemithermomechanical pulp (BCTMP), chemithermomechanical pulp (CTMP) pressure/pressure thermomechanical pulp (PTMP), thermomechanical pulp (TMP), thermomechanical chemical pulp (TMCP), high-yield sulfite pulps, and high-yield kraft pulps, all of which leave the resulting fibers with high levels of lignin. High-yield fibers are well known for their stiffness (in both dry and wet states) relative to typical chemically pulped fibers. The cell wall of kraft and other non-high-yield fibers tends to be more flexible because lignin, the "mortar" or "glue" on and in part of the cell wall, has been largely removed. Lignin is also nonswelling in water and hydrophobic, and resists the softening effect of water on the fiber, maintaining the stiffness of the cell wall in wetted high-yield fibers relative to kraft fibers. The preferred high-yield pulp fibers can also be characterized by being comprised of comparatively whole, relatively undamaged fibers, high freeness (250 Canadian Standard Freeness (CSF) or greater, more specifically 350 CFS or greater, and still more specifically 400 CFS or greater), and low fines content (less than 25 percent, more specifically less than 20 percent, still more specifically less that 15 percent, and still more specifically less than 10 percent by the Britt jar test).

In one embodiment of the present invention, the paper web contains softwood fibers in combination with high-yield pulp fibers, particularly BCTMP fibers. BCTMP fibers can be added to the web in order to increase the bulk and caliper of the web, while also reducing the cost of the web.

The amount of high-yield pulp fibers present in the sheet can vary depending upon the particular application. For instance, the high-yield pulp fibers can be present in an amount of about 2 dry weight percent or greater, particularly about 15 dry weight percent or greater, and more particularly from about 5 dry weight percent to about 40 dry weight percent, based upon the total weight of fibers present within the web.

In one embodiment, the paper web can be formed from multiple layers of a fiber furnish. The paper web can be produced, for instance, from a stratified headbox. Layered structures produced by any means known in the art are within the scope of the present invention, including those disclosed in U.S. Pat. No. 5,494,554 to Edwards, et al., which is incorporated herein by reference.

In one embodiment, for instance, a layered or stratified web is formed that contains high-yield pulp fibers in the center. Because high-yield pulp fibers are generally less soft than other papermaking fibers, in some applications, it is advantageous to incorporate them into the middle of the paper web, such as by being placed in the center of a 3-layered sheet. The outer layers of the sheet can then be made from softwood fibers and/or hardwood fibers.

For example, in one particular embodiment of the present invention, the paper web contains outer layers made from softwood fibers. Each outer layer can comprise from about 15% to about 40% by weight of the web and particularly can comprise about 25% by weight of the web. The middle layer, however, can comprise from about 40% to about 60% by weight of the web, and particularly about 50% by weight of the web. The middle layer can contain a mixture of softwood fibers and BCTMP fibers. The BCTMP fibers can be present in the middle layer in an amount from about 40% to about 60% by weight of the middle layer, and particularly in an amount of about 50% by weight of the middle layer.

The paper web of the present invention can also be formed without a substantial amount of inner fiber-to-fiber bond strength. In this regard, the fiber furnish used to form the base web can be treated with a chemical debonding agent. The debonding agent can be added to the fiber slurry during the pulping process or can be added directly into the head box. Suitable debonding agents that may be used in the present invention include cationic debonding agents such as fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665 to Kaun which is incorporated herein by reference. In particular, Kaun discloses the use of cationic silicone compositions as debonding agents.

In one embodiment, the debonding agent used in the process of the present invention is an organic quaternary ammonium chloride and particularly a silicone based amine salt of a quaternary ammonium chloride. For example, the debonding agent can be PROSOFT TQ1003 marketed by the Hercules Corporation. The debonding agent can be added to the fiber slurry in an amount of from about 1 kg per metric tonne to about 6 kg per metric tonne of fibers present within the slurry.

In an alternative embodiment, the debonding agent can be an imidazoline-based agent. The imidazoline-based debonding agent can be obtained, for instance, from the Witco Corp. The imidazoline-based debonding agent can be added in an amount of between 2.0 to about 15 kg per metric tonne.

In one embodiment, the debonding agent can be added to the fiber furnish according to a process as disclosed in PCT Application having an International Publication No. WO 99/34057 filed on Dec. 17, 1998 or in PCT Published Application having an International Publication No. WO 00/66835 filed on Apr. 28, 2000, which are both incorporated herein by reference. In the above publications, a process is disclosed in which a chemical additive, such as a debonding agent, is adsorbed onto cellulosic papermaking fibers at high levels. The process includes the steps of treating a fiber slurry with an excess of the chemical additive, allowing sufficient residence time for adsorption to occur, filtering the slurry to remove unadsorbed chemical additives, and redispursing the filtered pulp with fresh water prior to forming a nonwoven web.

Referring to FIG. 1, one embodiment of a device for forming a multi-layered stratified pulp furnish is illustrated. As shown, a three-layered head box generally 10 includes an upper head box wall 12 and a lower head box wall 14. Head box 10 further includes a first divider 16 and a second divider 18, which separate three fiber stock layers.

Each of the fiber layers comprise a dilute aqueous suspension of papermaking fibers. In one embodiment, for instance, middle layer 20 contains southern softwood kraft fibers either alone or in combination with other fibers such as high yield fibers. Outer layers 22 and 24, on the other hand, contain softwood fibers, such as northern softwood kraft.

An endless traveling forming fabric 26, suitably supported and driven by rolls 28 and 30, receives the layered papermaking stock issuing from head box 10. Once retained on fabric 26, the layered fiber suspension passes water through the fabric as shown by the arrows 32. Water removal is achieved by combinations of gravity, centrifugal force and vacuum suction depending on the forming configuration.

Forming multi-layered paper webs is also described and disclosed in U.S. Pat. No. 5,129,988 to Farringtonne, Jr., which is incorporated herein by reference.

The basis weight of paper webs used in the process of the present invention can vary depending upon the final product. For example, the process of the present invention can be used to produce tissue webs, paper towels, industrial wipers, and the like. For these products, the basis weight of the paper web can vary from about 15 gsm to about 110 gsm, and particularly from about 35 gsm to about 70 gsm. In one particular embodiment, it has been discovered that the present invention is particularly well-suited for the production of wiping products having a basis weight of from about 53 gsm to about 63 gsm.

As stated above, the manner in which the paper web is formed can also vary depending upon the particular application. In general, the paper web can be formed by any of a variety of papermaking processes known in the art. For example, the paper web can be a wet-creped web, a calendared web, an embossed web, a through-air dried web, a creped through-air dried web, an uncreped through-air dried web, as well various combinations of the above. In one particular embodiment of the present invention, however, the paper web is made in an uncreped through-air dried process. It has been discovered that uncreped through-air dried webs provide particular advantages when used in the process of the present invention.

Figure 2:
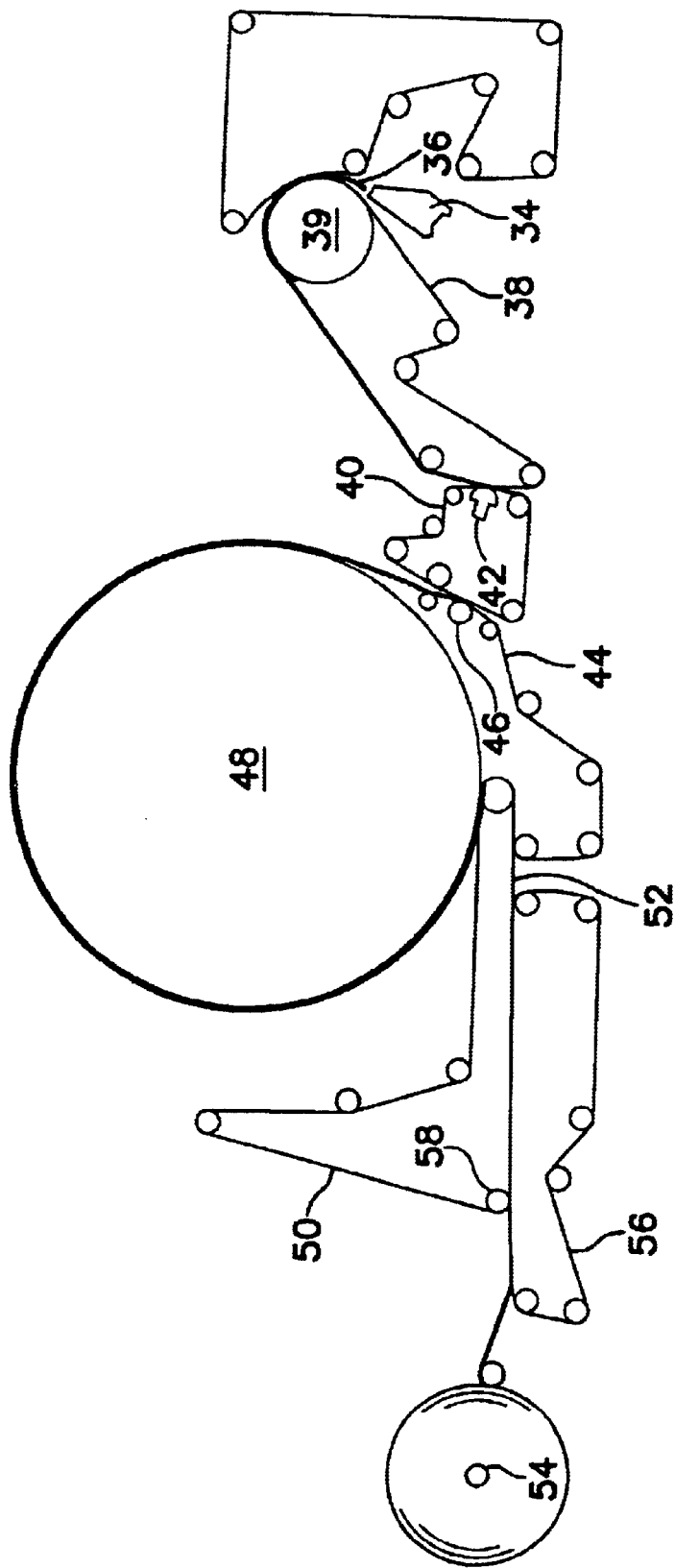
FIG. 2 is a schematic diagram of one embodiment of a process for forming uncreped through-dried paper webs for use in the present invention.

For example, referring to FIG. 2, shown is a method for making throughdried paper sheets in accordance with this invention. (For simplicity, the various tensioning rolls schematically used to define the several fabric runs are shown but not numbered. It will be appreciated that variations from the apparatus and method illustrated in FIG. 2 can be made without departing from the scope of the invention). Shown is a twin wire former having a papermaking headbox 34, such as a layered headbox, which injects or deposits a stream 36 of an aqueous suspension of papermaking fibers onto the forming fabric 38 positioned on a forming roll 39. The forming fabric serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 40. In one embodiment, the transfer fabric can be traveling at a slower speed than the forming fabric in order to impart increased stretch into the web. This is commonly referred to as a "rush" transfer. Preferably the transfer fabric can have a void volume that is equal to or less than that of the forming fabric. The relative speed difference between the two fabrics can be from 0–60 percent, more specifically from about 15–45 percent. Transfer is preferably carried out with the assistance of a vacuum shoe 42 such that the forming fabric and the transfer fabric simultaneously converge and diverge at the leading edge of the vacuum slot.

The web is then transferred from the transfer fabric to the throughdrying fabric 44 with the aid of a vacuum transfer roll 46 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer can be carried out with vacuum assistance to ensure deformation of the sheet to conform to the throughdrying fabric, thus yielding desired bulk and appearance if desired. Suitable throughdrying fabrics are described in U.S. Pat. No. 5,429,686 issued to Kai F. Chiu et al. and U.S. Pat. No. 5,672,248 to Wendt, et al. which are incorporated by reference.

In one embodiment, the throughdrying fabric contains high and long impression knuckles. For example, the throughdrying fabric can have about from about 5 to about 300 impression knuckles per square inch which are raised at least about 0.005 inches above the plane of the fabric. During drying, the web can be macroscopically arranged to conform to the surface of the throughdrying fabric and form a three-dimensional surface. Flat surfaces, however, can also be used in the present invention.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is final dried to a consistency of about 94 percent or greater by the throughdryer 48 and thereafter transferred to a carrier fabric 50. The dried basesheet 52 is transported to the reel 54 using carrier fabric 50 and an optional carrier fabric 56. An optional pressurized turning roll 58 can be used to facilitate transfer of the web from carrier fabric 50 to fabric 56. Suitable carrier fabrics for this purpose are Albany International 84M or 94M and Asten 959 or 937, all of which are relatively smooth fabrics having a fine pattern. Although not shown, reel calendering or subsequent off-line calendering can be used to improve the smoothness and softness of the basesheet.

In one embodiment, the reel 54 shown in FIG. 2 can run at a speed slower than the fabric 56 in a rush transfer process for building crepe into the paper web 52. For instance, the relative speed difference between the reel and the fabric can be from about 5% to about 25% and, particularly from about 12% to about 14%. Rush transfer at the reel can occur either alone or in conjunction with a rush transfer process upstream, such as between the forming fabric and the transfer fabric.

In one embodiment, the paper web 52 is a textured web which has been dried in a three-dimensional state such that the hydrogen bonds joining fibers were substantially formed while the web was not in a flat, planar state. For instance, the web can be formed while the web is on a highly textured throughdrying fabric or other three-dimensional substrate. Processes for producing uncreped throughdried fabrics are, for instance, disclosed in U.S. Pat. No. 5,672,248 to Wendt, et al.; U.S. Pat. No. 5,656,132 to Farringtonne, et al.; U.S. Pat. No. 6,120,642 to Lindsay and Burazin; U.S. Pat. No. 6,096,169 to Hermans, et al.; U.S. Pat. No. No. 6,197,154 to Chen, et al.; and U.S. Pat. No. 6,143,135 to Hada, et al., all of which are herein incorporated by reference in their entireties.

As mentioned above, uncreped through-air dried paper webs made according to the process illustrated in FIG. 2 provide various advantages in the process of the present invention. It should be understood, however, that other types of paper webs can be used in the present invention. For example, in an alternative embodiment, a wet creped paper web can be utilized.

Figure 3:
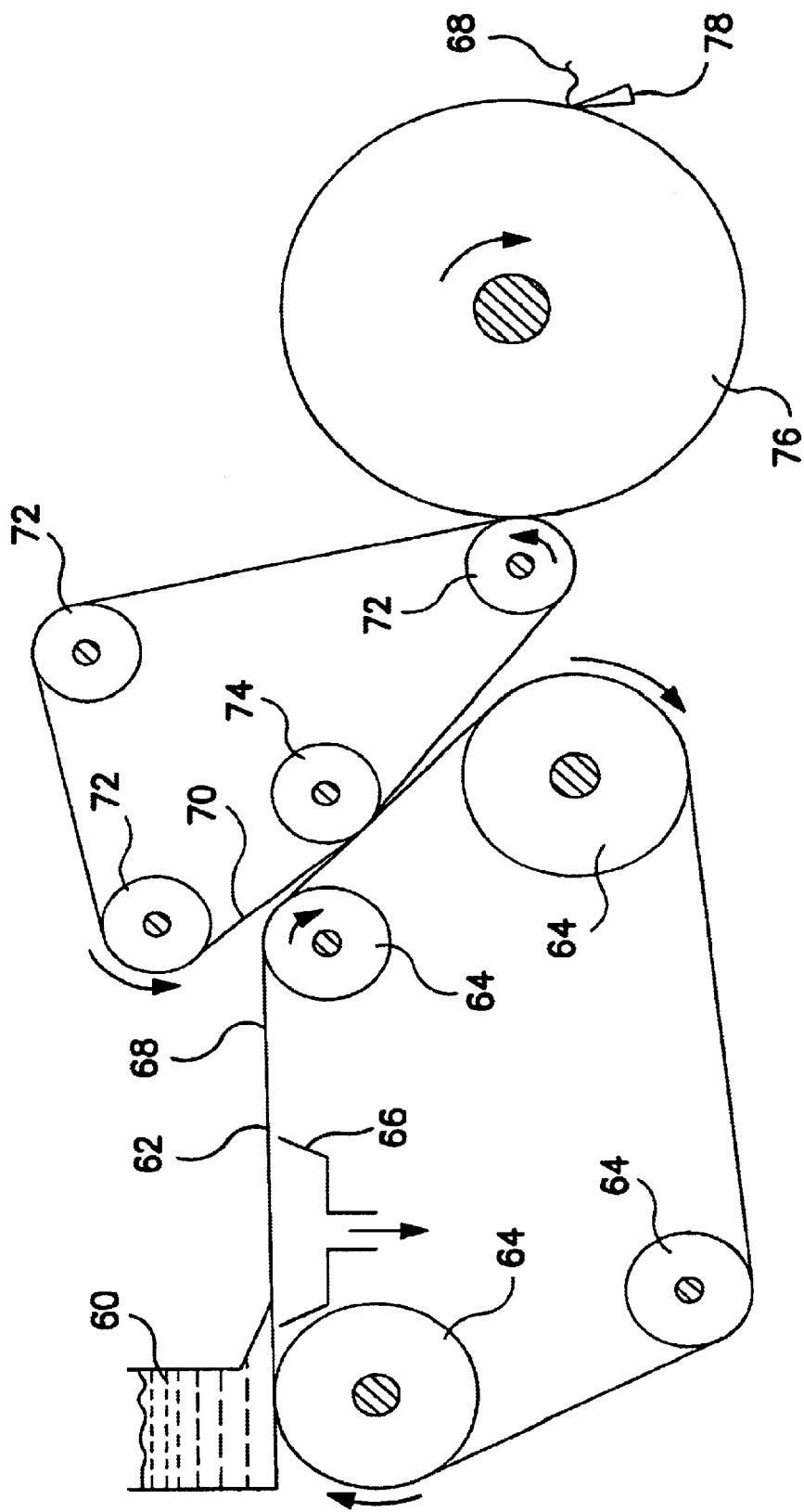
FIG. 3 is a schematic diagram of one embodiment of a process for forming wet creped paper webs for use in the present invention.

For example, referring to FIG. 3, one embodiment of a papermaking machine is illustrated capable of forming a paper web for use in the process of the present invention. As shown, in this embodiment, a head box 60 emits an aqueous suspension of fibers onto a forming fabric 62 which is supported and driven by a plurality of guide rolls 64. A vacuum box 66 is disposed beneath forming fabric 62 and is adapted to remove water from the fiber furnish to assist in forming a web.

From forming fabric 62, a formed web 68 is transferred to a second fabric 70, which may be either a wire or a felt. Fabric 70 is supported for movement around a continuous path by a plurality of guide rolls 72. Also included is a pick up roll 74 designed to facilitate transfer of web 68 from fabric 62 to fabric 70.

From fabric 70, web 68, in this embodiment, is transferred to the surface of a rotatable heated dryer drum 76, such as a Yankee dryer. Web 68 is lightly pressed into engagement with the surface of dryer drum 76 to which it adheres, due to its moisture content and its preference for the smoother of the two surfaces. In some cases, however, an adhesive can be applied over the web surface or drum surface for facilitating attachment of the web to the drum.

As web 68 is carried through a portion of the rotational path of the dryer surface, heat is imparted to the web causing most of the moisture contained within the web to be evaporated. Web 68 is then removed from dryer drum 76 by a creping blade 78. Although optional, creping web 78 as it is formed further reduces internal bonding within the web and increases softness.

Figure 4:
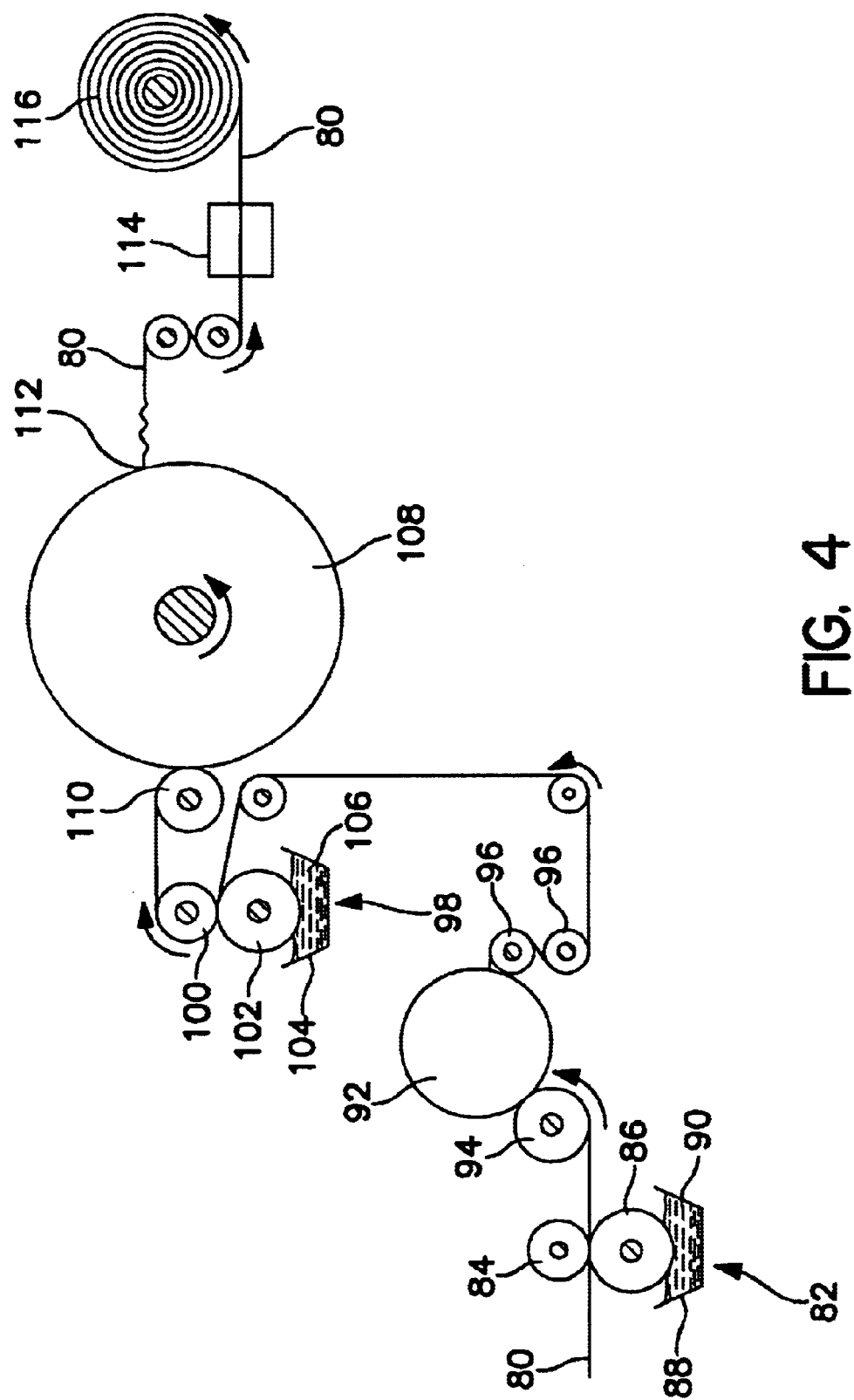
FIG. 4 is a schematic diagram of one embodiment of a process for applying bonding materials to each side of a paper web and creping one side of the web in accordance with the present invention.

Once the paper web is formed, a bonding material is applied to each side of the web and at least one side of the web is then creped. In general, for most applications, the paper web will only be creped on one side after the bonding materials are applied. It should be understood, however, that in some situations it may be desirable to crepe both sides of the web. Referring to FIG. 4, one embodiment of a system that may be used to apply bonding materials to the paper web and to crepe one side of the web is illustrated. The embodiment shown in FIG. 4 can be an in-line or off-line process. As shown, paper web 80 made according to the process illustrated in FIG. 2 or FIG. 3 or according to a similar process, is passed through a first bonding agent application station generally 82. Station 82 includes a nip formed by a smooth rubber press roll 84 and a patterned rotogravure roll 86. Rotogravure roll 86 is in communication with a reservoir 88 containing a first bonding material 90. Rotogravure roll 86 applies the bonding material 90 to one side of web 80 in a preselected pattern.

Web 80 is then contacted with a heated roll 92 after passing a roll 94. The heated roll 92 is for partially drying the web. The heated roll 92 can be heated to a temperature, for instance, up to about 250° F. and particularly from about 180° F. to about 220° F. In general, the web can be heated to a temperature sufficient to dry the web and evaporate any water.

It should be understood, that the besides the heated roll 92, any suitable heating device can be used to dry the web. For example, in an alternative embodiment, the web can be placed in communication with an infra-red heater in order to dry the web. Besides using a heated roll or an infra-red heater, other heating devices can include, for instance, any suitable convective oven or microwave oven.

From the heated roll 92, the web 80 can be advanced by pull rolls 96 to a second bonding material application station generally 98. Station 98 includes a transfer roll 100 in contact with a rotogravure roll 102, which is in communication with a reservoir 104 containing a second bonding material 106. Similar to station 82, second bonding material 106 is applied to the opposite side of web 80 in a preselected pattern. Once the second bonding material is applied, web 80 is adhered to a creping roll 108 by a press roll 110. Web 80 is carried on the surface of the creping drum 108 for a distance and then removed therefrom by the action of a creping blade 112. The creping blade 112 performs a controlled pattern creping operation on the second side of the paper web.

In accordance with the present invention, the second bonding material 106 is selected such that the web 80 can be creped from the creping drum 108 while the creping drum is at a relatively low temperature. For example, in accordance with the present invention, the creping drum 108 can be maintained at a temperature of less than 200° F., and particularly less than 150° F. In one embodiment, for example, the creping drum 108 can be at ambient temperatures.

Since creping is accomplished at relatively low temperatures, the creping drum 108 can have various constructions. For example, in one embodiment, the creping drum can be a Yankee dryer that is not heated or only heated to a relatively low temperature. Alternatively, however, the creping drum can be a roll having a cast iron surface. The diameter of the creping drum can vary and is generally not critical.

Once creped, paper web 80, in this embodiment, is pulled through a drying station 114. Drying station 114 can include any form of a heating unit, such as an oven energized by infrared heat, microwave energy, hot air or the like. Drying station 114 may be necessary in some applications to dry the web and/or cure the first and second bonding materials. Depending upon the bonding agents selected, however, in other applications drying station 114 may not be needed.

The amount that the paper web is heated within the drying station 114 can depend upon the particular bonding materials used, the amount of bonding materials applied to the web, and the type of web used. In some applications, for instance, the paper web can be heated using a gas stream such as air at a temperature of about 510° F. in order to cure the bonding materials. When using low cure temperature bonding materials, on the other hand, the gas can be at a temperature lower than about 270° F. and particularly lower than about 250° F. In an alternative embodiment, the drying station 114 is not used to cure the bonding material applied to the web. Instead, the drying station 114 is used to dry the web and to drive off any water present in the web. In this embodiment, the web can be heated to temperatures sufficient to evaporate water, such as to a temperature of from about 200° F. to about 250° F.

Once passed through drying station 114, web 80 can be wound into a roll of material 116.

In one embodiment of the present invention, a low temperature cure bonding material can be used that is believed to further cure over time. For example, it has been discovered by the present inventor that when using some types of bonding materials, the wet strength of the treated paper web increases over time. The increase in wet strength can be permanent or temporary. For example, increases in wet strength have been found to occur over 1 day intervals and 3 day intervals.

More specifically, particular bonding materials can be chosen that when applied to a web in accordance with the present invention, the wet strength of the paper product can increase by at least 25% in the cross machine direction 72 hours after application when the paper product is stored at ambient temperatures. More particularly, the wet strength of the web can increase by at least 30%, and more particularly can increase by at least 35% over a 72 hour period. Further, these increases in wet strength can occur in shorter intervals of time, such as after 48 hours or after 24 hours.

The bonding materials applied to each side of the paper web are selected for not only assisting in creping the web but also for adding dry strength, wet strength, stretchability, and tear resistance to the paper. Particular bonding materials that may be used in the present invention include latex compositions, such as acrylates, vinyl acetates, vinyl chlorides and methacrylates. Some water-soluble bonding materials may also be used including polyacrylamides, polyvinyl alcohols and cellulose derivatives such as carboxymethyl cellulose. In one embodiment, the bonding materials used in the process of the present invention comprise an ethylene vinyl acetate copolymer. In particular, the ethylene vinyl acetate copolymer can be cross-linked with N-methyl acrylamide groups using an acid catalyst. Suitable acid catalysts include ammonium chloride, citric acid and maleic acid.

As described above, and in accordance with the present invention, the second bonding material applied to the paper web is a bonding material that can adhere to a creping surface at a relatively low temperature. Examples of such bonding materials are produced by Air Products Corporation. One particular bonding material, for instance, is AIR-FLEX EN1165.

In another embodiment, the low temperature bonding material can be a bonding material as described in U.S. Pat. No. 6,117,492 to Goldstein, et al., which is incorporated herein by reference. In the '492 patent, a polymeric binder is disclosed that has been reacted with a polyaldehyde. The polyaldehyde can be a dialdehyde such as glyoxal or glutaraldehyde. The polymeric binder can also be reacted with a polyaziridine functional compound.

The polymeric binder itself can be formed from a variety of ethylenically unsaturated monomers. For example, the polymeric binder can be formed by combining a vinyl acetate, a (meth)acrylic acid, an acetoacetoxyethyl (meth) ethacrylate, and a C1 to C8 alkyl (meth)acrylic ester. Such a polymer can have a glass transition temperature of from about −5° C. to about 10° C.

In general, the first bonding material and the second bonding material can be different bonding materials or the same bonding material.

The bonding materials are applied to the base web as described above in a preselected pattern. In one embodiment, for instance, the bonding materials can be applied to the web in a reticular pattern, such that the pattern is interconnected forming a net-like design on the surface.

In an alternative embodiment, however, the bonding materials are applied to the web in a pattern that represents a succession of discrete shapes. Applying the bonding material in discrete shapes, such as dots, provides sufficient strength to the web without covering a substantial portion of the surface area of the web.

According to the present invention, the bonding materials are applied to each side of the paper web so as to cover from about 15% to about 75% of the surface area of the web.
More particularly, in most applications, the bonding material will cover from about 20% to about 60% of the surface area of each side of the web. The total amount of bonding material applied to each side of the web can be in the range of from about 4% to about 10% by weight, based upon the total weight of the web.

At the above amounts, the bonding materials can penetrate the paper web from about 10% to about 70% of the total thickness of the web. In most applications, the bonding materials should at least penetrate from about 10% to about 15% of the thickness of the web.

Figure 5:
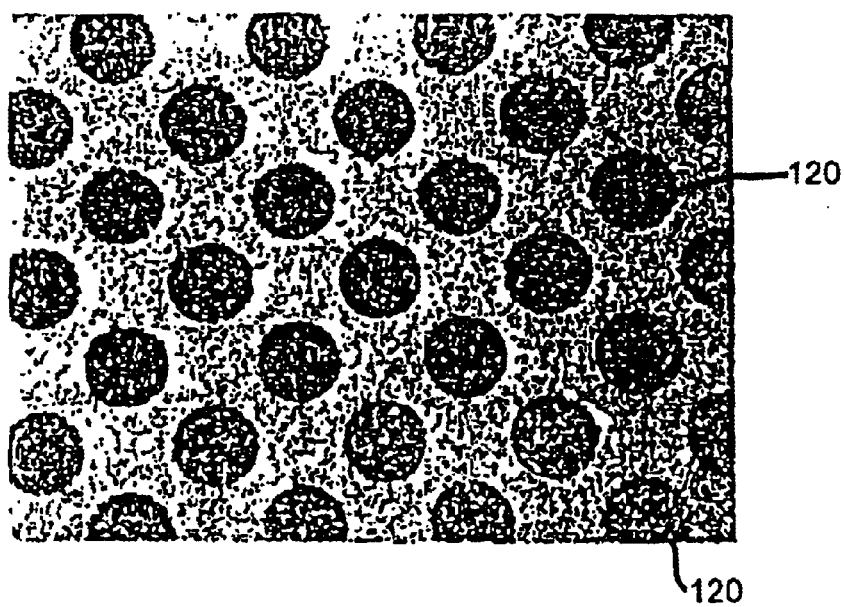
FIG. 5 is a plan view of one embodiment of a pattern that is used to apply bonding materials to paper webs made in accordance with the present invention.

Referring to FIG. 5, one embodiment of a pattern that can be used for applying a bonding material to a paper web in accordance with the present invention is shown. As illustrated, the pattern shown in FIG. 5 represents a succession of discrete dots 120. In one embodiment, for instance, the dots can be spaced so that there are approximately from about 25 to about 35 dots per inch in the machine direction or the cross-machine direction. The dots can have a diameter, for example, of from about 0.01 inches to about 0.03 inches. In one particular embodiment, the dots can have a diameter of about 0.02 inches and can be present in the pattern so that approximately 28 dots per inch extend in either the machine direction or the cross-machine direction. In this embodiment, the dots can cover from about 20% to about 30% of the surface area of one side of the paper web and, more particularly, can cover about 25% of the surface area of the web.

Figure 7:
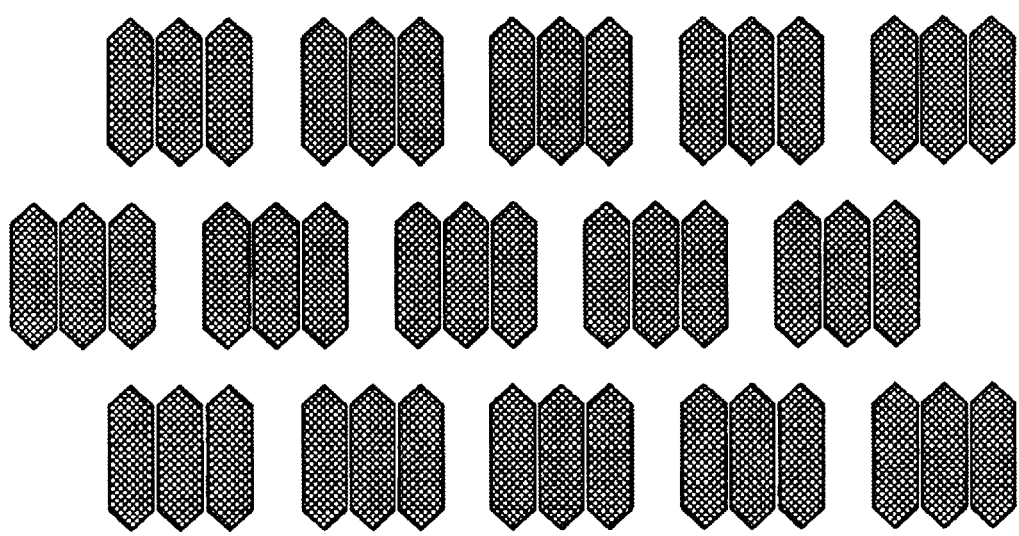
FIG. 7 is a plan view of another alternative embodiment of a pattern that is used to apply bonding materials to paper webs in accordance with the present invention.

Besides dots, various other discrete shapes can also be used. For example, as shown in FIG. 7, a pattern is illustrated in which the pattern is made up of discrete shapes that are each comprised of three elongated hexagons. In one embodiment, the hexagons can be about 0.02 inches long and can have a width of about 0.006 inches. Approximately 35 to 40 groups of hexagons per inch can be spaced in the machine direction and the cross-machine direction. When using hexagons as shown in FIG. 7, the pattern can cover from about 40% to about 60% of the surface area of one side of the web, and more particularly can cover about 50% of the surface area of the web.

Figure 6:
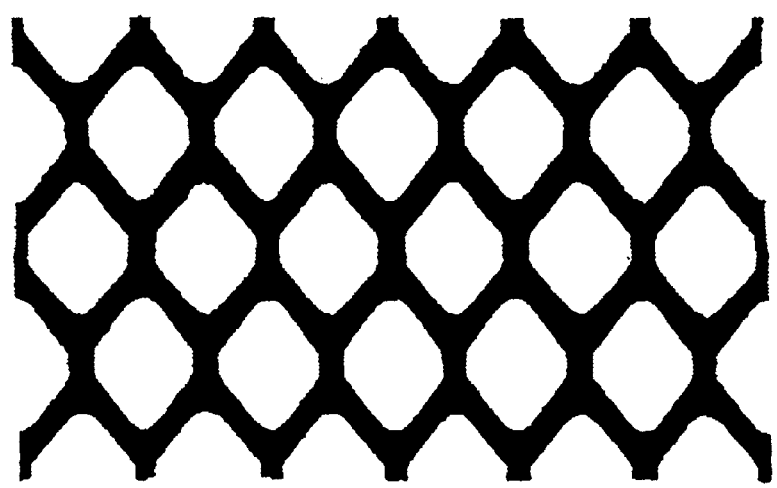
FIG. 6 is another embodiment of a pattern that is used to apply bonding materials to paper webs in accordance with the present invention.

Referring to FIG. 6, another embodiment of a pattern for applying a bonding material to a paper web is shown. In this embodiment, the pattern is a reticulated grid. More specifically, the reticulated pattern is in the shape of diamonds. When used, a reticulated pattern may provide more strength to the web in comparison to patterns that are made up on a succession of discrete shapes.

In one particular embodiment of the present invention, a first bonding material is applied to a paper web according to the pattern shown in FIG. 5. A second bonding material, on the other hand, is applied to a second side of the paper web according to the pattern illustrated in FIG. 7. The second bonding material is applied to a greater amount of the surface area than the first bonding material. For example, the first bonding material can be applied according to the pattern shown in FIG. 5 and can cover approximately 25% of the surface area of the first side of the web. The second bonding material, however, is applied according to the pattern shown in FIG. 7 and covers approximately 50% of the surface area of the second side of the web. Through this process, a paper product is formed having enhanced overall properties.

The process that is used to apply the bonding materials to the paper web in accordance with the present invention can vary. For example, various printing methods can be used to print the latex bonding materials onto the base sheet depending upon the particular application. Such printing methods can include direct gravure printing using two separate gravures for each side, offset gravure printing using duplex printing (both sides printed simultaneously) or station-to-station printing (consecutive printing of each side in one pass). In another embodiment, a combination of offset and direct gravure printing can be used. In still another embodiment, flexographic printing using either duplex or station-to-station printing can also be utilized to apply the bonding materials.

According to the process of the current invention, numerous and different paper products can be formed. In general, the paper products are single-ply wiper products. The products can be, for instance, facial tissues, bath tissues, paper towels, napkins, industrial wipers, and the like. As stated above, the basis weight can range anywhere from about 15 gsm to about 110 gsm. In one particular embodiment, the present invention is directed to the production of a paper towel product having a basis weight of from about 35 gsm to about 70 gsm.

The present invention may be better understood with reference to the following examples.

EXAMPLE 1

To illustrate the properties of a wiping product made in accordance with the present invention, an uncreped through-air dried (UCTAD) base web was treated with a bonding material according to the teachings of the present invention and the web was then subjected to various standardized tests. The UCTAD base web was formed in a process similar to the method shown in FIG. 2. In this particular example, the base web was made from a stratified fiber furnish containing a center layer of fibers positioned between two outer layers of fibers. Both outer layers of the UCTAD base web contained 100% northern softwood Kraft pulp and up to 6 kg/MT of TQ1003 debonder obtained from the Hercules Corporation. The center layer contained 50% softwood Kraft pulp and 50% BCTMP pulp and up to 6 kg/MT of TQ1003 debonder.

The first side of the web was printed with a bonding material using direct rotogravure printing. Then, the printed web passed over a heated roll to evaporate water. Next, the second side of the web was printed with the bonding material using a second rotogravure printer. The web was then pressed against and doctored off a rotating drum, which had a surface temperature of 125 degrees Fahrenheit. Finally, the sheet was dried and the bonding material cured and wound into a roll.

The bonding material in this particular example included AirFlex EN1165, which was obtained from Air Products, Inc. of Allentown, Pa. Air Flex EN1165 contains an ethylene vinyl acetate copolymer.

The bonding material containing, AirFlex EN1165, had the following formulation:

TABLE 1

| | |
|---|---|
| EN1165 (52% solids, nominal) | 10500 g |
| Nalco 94PA093 Defoamer (100% solids) | 54 g |
| Water | 3000 g |
| Catalyst (Ammonium Chloride) (10% solids) | 545 g |
| Thickener (Hercules) (2% solids) Natrasol 250MR | 1100 g |

The samples were then subjected to standardized tests for wet and dry tensile strength and stretch. The term "elongation" refers to the increase in length of a sample during testing. The tensile strength and the percent stretch of samples were determined in the machine direction (MD) and in the cross machine direction (CD). The results are expressed in pounds or grams to break and percent stretch before breakage. Higher numbers indicate a stronger, more stretchable fabric.

During these test, strength was determined using a geometric mean tensile strength test (GMT). The size of the samples tested were 3 inches in width. During the test, each end of a sample was placed in an opposing clamp. The clamps held the material in the same plane, usually vertically, separated by 4 inches and moved apart at a ten inch per minute rate of extension. The clamps moved apart until breakage occurred in order to measure the tensile strength of the sample. The geometric mean tensile strength was then calculated by taking the square root of the machine-direction tensile strength of the sample multiplied by the cross-direction tensile strength of the sample.

Tensile strength tests and elongation tests were performed on a SYNERGY tester available from MTS Systems, Corp. located in Eden Prairie, Minn. Results are reported in grams or in grams per inch width of sample.

Wet tensile strength was measured in the same manner as dry strength except that the sample was wetted prior to testing. Specifically, in order to wet the sample, a 3"×5" tray is filled with distilled or deionized water at a temperature of 23±2° C. The water is added to the tray to an approximate 1 centimeter depth.

A 3M "Scotch-Brite" general purpose scrubbing pad is then cut to dimensions of 2.5" long×4" wide. A piece of masking tape approximately 5" long is placed along one of the 4" edges of the pad. The masking tape is used to hold the scrubbing pad.

The scrubbing pad is then placed into the water with the taped end facing up. The pad remains in the water at all times until testing is completed. The sample to be tested is placed on blotter paper that conforms TAPPI T205. The scrubbing pad is removed from the water bath and taped lightly three times on a screen associated with the wetting pan. The scrubbing pad is then gently placed on the sample parallel to the width of the sample in the approximate center. The scrubbing pad is held in place for approximately 1 second. The sample is then immediately put into the tensile tester and tested.

To calculate the wet/dry tensile strength ratio, the wet tensile strength value was divided by the dry tensile strength value.

All samples were tested in both the machine direction and the cross direction to obtain percent stretch value.

To calculate the percent elongation, the length of the sample at rest was divided by the maximum length of the sample prior to breakage. All samples were tested in both the machine direction and the cross direction.

The results of the tests obtained when the AirFlex EN1165 bonding agent was used are shown below:

TABLE 2

| | |
|---|---|
| GMT (grams/76 mm) | 1387 |
| MD Tensile (grams/76 mm) | 1602 |
| MD Stretch (%) | 26.2 |
| CD Tensile (grams/76 mm) | 1201 |
| CD Stretch (%) | 14.5 |
| CD Wet Tensile | 879.4 |
| CD Wet/Dry Ratio | 70.9% |

EXAMPLE 2

In this example, a wiping product was formed as described in Example 1 using a bonding agent, namely AirFlex 426, obtained from Air Products, Inc. of Allentown, Pa. Air Flex 426 is a polyvinyl acetate emulsion. The bonding material had the following formulation:

TABLE 3

| | |
|---|---|
| AirFlex 426 (63% solids, nominal) | 8000 g |
| Nalco 94PA093 Defoamer (100% solids) | 50 g |
| Water | 3920 g |
| Experimental Additive 16055-94A (Air Products) | 1250 g |
| Thickener (Hercules) (2% solids) Natrasol 250MR | 1050 g |

Standardized tests for stretch and wet/dry tensile strength were conducted, as described in Example 1, on a UCTAD base web printed with AirFlex A426 bonding agent in accordance to the present invention. The following results were obtained:

TABLE 4

| | |
|---|---|
| GMT (grams/76 mm) | 1355 |
| MD Tensile (grams/76 mm) | 1628 |
| MD Stretch (%) | 29.2 |
| CD Tensile (grams/76 mm) | 1128 |
| CD Stretch (%) | 11.5 |
| CD Wet Tensile | 700.7 |
| CD Wet/Dry Ratio | 62.1% |

In this example, the CD wet/dry ratio was tested soon after the product was formed and then retested 3 weeks later. Initially, the paper web was found to have a wet/dry ratio of approximately 30%. The wet/dry ratio then increased to approximately 62% over a 3 week time period. Although unknown, it is believed that the bonding material continued to cure over the 3 week storage period.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for producing a paper product comprising the steps of:
   providing a paper web comprising softwood fibers, said paper web having a first side and a second side;
   applying a first bonding material to said first side of said web in a preselected pattern;
   applying a second bonding material to said second side of said web in a preselected pattern and adhering said second side of said web to a creping surface, said creping surface being at a temperature of greater than about 50° F. and less than about 150° F., said second bonding material comprising a polymeric binder reacted with a polyaldehyde; and
   creping said second side of said web from said creping surface.

2. A method as defined in claim 1, wherein the paper web further comprises high-yield fibers.

3. A method as defined in claim 2, wherein the paper web contains high-yield fibers in an amount from about 2% to about 40% by weight.

4. A method as defined in claim 1, wherein the paper web includes a middle layer comprising softwood fibers, a first outer layer comprising softwood fibers and a second outer layer also comprising softwood fibers.

5. A method as defined in claim 1, wherein the creping surface is at a temperature of less than about 125° F.

6. A method as defined in claim 1, wherein the creping surface is not heated.

7. A method as defined in claim 1, wherein the paper web that is provided comprises an uncreped through-air dried web.

8. A method as defined in claim 7, wherein the uncreped through-air dried web has undergone rush transfer between a first web conveying device and a second web conveying device prior to applying said bonding materials, said web conveying devices having a speed differential of from about 5% to about 45%.

9. A method as defined in claim 1, wherein said paper web further comprises a debonding agent, said debonding agent being added to said web in an amount from about 1 kg/metric tonne to about 6 kg/metric tonne based on the total weight of fibers contained in said web, said debonding agent inhibiting the fibers in said web from bonding together during formation of said paper web.

10. A method as defined in claim 1, wherein said first bonding material is applied to said first side of said paper web in a pattern that covers from about 20% to about 40% of the surface area of said first side, and wherein said second bonding material is applied to said second side of said paper web in a pattern that covers from about 40% to about 60% of the surface area of said second side.

11. A method as defined in claim 10, wherein said first bonding material and said second bonding material are applied to said first and second sides of said paper web in a combined amount of from about 4% to about 10% by weight of said paper web.

12. A method as defined in claim 10, wherein said second bonding material is applied to said paper web in a preselected pattern that comprises a succession of discrete shapes.

13. A method as defined in claim 1, wherein the first bonding material and the second bonding material are selected such that the wet strength of the paper product increases by at least 25% in the cross machine direction 72 hours after application of the bonding materials when the paper product is stored at ambient temperatures.

14. A method as defined in claim 1, wherein the second bonding material has a glass transition temperature of less than about 10° C.

15. A method as defined in claim 1, wherein the paper web is heated after said first bonding material is applied and prior to applying said second bonding material, the web being heated to a temperature of at least 150° F.

16. A method as defined in claim 1, wherein the polyaldehyde that is reacted with the polymeric binder comprises glyoxal.

17. A method as defined in claim 1, wherein the polyaldehyde that is reacted with the polymeric binder comprises glutaraldehyde.

18. A method as defined in claim 1, wherein the polymeric binder comprises an ethylenically unsaturated monomer.

19. A method as defined in claim 1, the second side of the web is adhered to the creping surface for a period of less than about 0.3 seconds prior to being creped.

20. A single ply paper product made according to the process defined in claim 1, wherein said paper product has a basis weight of from about 15 gsm to about 110 gsm.

21. A method for producing a paper product comprising the steps of:
   providing a paper web comprising softwood fibers, the paper web having a first side and a second side, the paper web comprising an uncreped through-air dried web;
   applying a first bonding material to the first side of the web in a preselected pattern without creping the web;
   applying a second bonding material to the second side of the web in a preselected pattern and adhering the second side of the web to a creping surface, the creping surface being at a temperature of less than about 200° F., wherein the second bonding material comprises glyoxal; and
   creping the second side of the web from the creping surface.

22. A method as defined in claim 21, wherein the paper web comprises a stratified paper web having a middle layer containing softwood fibers, a first outer layer comprising softwood fibers and a second outer layer comprising softwood fibers.

23. A method as defined in claim 21, wherein the paper web contains high-yield fibers in a amount from about 2% to about 4% by weight.

24. A method as defined in claim 21, wherein the creping surface is at a temperature of less than about 125° F.

25. A method as defined in claim 21, wherein the uncreped through-air dried web has undergone rush transfer between a first web conveying device and a second web conveying device, said second web conveying device being downstream from said first web conveying device, said second web conveying device moving from about 5% to about 45% slower than said first web conveying device.

26. A method as defined in claim 21, wherein the first bonding material and the second bonding material are applied to the paper web in patterns that comprise a succession of discrete shapes.

27. A method as defined in claim 26, wherein the second bonding material is applied in a pattern that covers a greater surface area on the paper web than the pattern used to apply the first bonding material.

28. A method as defined in claim 21, wherein the second bonding material is applied in a pattern that covers a greater surface area on the paper web than the pattern used to apply the first bonding material.

29. A method as defined in claim 21, wherein the first bonding material and the second bonding material are selected such that the wet strength of the paper product increases by at least 25% in the cross machine direction 72 hours after application of the bonding materials when the paper product is stored at ambient temperatures.

30. A method as defined in claim 21, wherein the second bonding material comprises a polymeric binder reacted with the glyoxal.

31. A method as defined in claim 30, wherein the polymeric binder comprises an ethylenically unsaturated monomer.

32. A method as defined in claim 21, wherein the second side of the web is adhered to the creping surface for a period of less than about 0.3 seconds prior to being creped.

33. A method for producing a paper product comprising the steps of:
   providing a paper web comprising softwood fibers, said paper web having a first side and a second side;
   applying a first bonding material to said first side of said web in a preselected pattern;
   applying a second bonding material to said second side of said web in a preselected pattern and adhering said second side of said web to a creping surface, said creping surface being at a temperature of greater than about 50° F. and less than about 150° F., said second bonding agent material comprising a polymeric binder reacted with a polyaldehyde; and
   creping said second side of said web from said creping surface, and wherein the second side of the web is adhered to the creping surface for a period of time of less than about 0.3 seconds prior to being creped from the creping surface.

34. A method as defined in claim 33, wherein the second side of the web is adhered to the creping surface for a period of less than about 0.25 seconds prior to being creped.

35. A method as defined in claim 33, wherein the second side of the web is adhered to the creping surface for a period of less than about 0.22 seconds prior to being creped.

36. A method as defined in claim 33, wherein the polyaldehyde comprises glyoxal.

\* \* \* \* \*

UNITED STATES PATENT AND TRADEMARK OFFICE
CERTIFICATE OF CORRECTION

PATENT NO. : 6,846,383 B2
DATED : January 25, 2005
INVENTOR(S) : Maurizio Tirimacco It is certified that error appears in the above-identified patent and that said Letters Patent is hereby corrected as shown below:

Column 16,
Lines 62-64, should read as follows:
19. A method as defined in claim 1, wherein the second side of the web is adhered to the creping surface for a period of less than about 0.3 seconds prior to being creped.

Column 17,
Lines 23-25, should read as follows:
23. A method as defined in claim 21, wherein the paper web contains high-yield fibers in an amount from about 2% to about 40% by weight.

Signed and Sealed this

Sixteenth Day of August, 2005

JON W. DUDAS
*Director of the United States Patent and Trademark Office*